June 2, 1959  C. A. STEPHENS ET AL  2,889,163
OIL SEALS

Filed July 26, 1957  3 Sheets-Sheet 1

CLIFFORD A. STEPHENS
ROBERT W. McCANDLESS
INVENTORS

June 2, 1959 C. A. STEPHENS ET AL 2,889,163
OIL SEALS

Filed July 26, 1957 3 Sheets-Sheet 2

CLIFFORD A. STEPHENS
ROBERT W. MCCANDLESS
INVENTORS

BY

United States Patent Office 2,889,163
Patented June 2, 1959

2,889,163

OIL SEALS

Clifford A. Stephens, Palo Alto, and Robert W. McCandless, Redwood City, Calif., assignors to Federal-Mogul-Bower Bearings, Inc., Detroit, Mich., a corporation of Michigan Application July 26, 1957, Serial No. 674,540

6 Claims. (Cl. 288—3)

This invention relates to metal encased oil seals of the type commonly employed on shafts and the like, and more particularly to a new and improved mode of insuring a fluid-tight seal between the metal case of the seal and the part of the machine with which the case forms a press fit. This application is a continuation-in-part of Serial No. 444,686, filed July 21, 1954, and now abandoned.

Usually, seals are designed for applications in which the external periphery of the metal case has a press fit with the housing bore through which a shaft extends. However, in certain applications the internal periphery of a metal case is press fitted over a shaft and the lip of the seal is maintained in light contact with the bore wall. In either application, it is most important to have a fluid-tight seal formed between the metal case and the metal part against which it is pressed. Although the fit between the parts is always intended to be sufficiently close to assure this result, this admirable intention is not uniformly obtained in actual manufacturing practice. There are several principal reasons for this. One of the chief ones in the unavoidable variation among parts due to manufacturing tolerances on both the seal case and the housing or shaft it is to be used with. Another is the presence of imperfections in the metal walls that are supposed to be in contact with one another, including undetected flaws in the metals, tool marks, and damage caused in handling, shipping, etc. Still another frequent cause for leakage is oxidation of the metal surfaces before assembly.

Heretofore, it has been necessary to apply a sealing compound to one or both of the mating metal surfaces preliminary to the assembly of the seal in its place of use. The putty-like sealing compounds customarily used must be applied by hand—a time-consuming and laborious procedure attended by many problems. Among these problems is the difficulty of obtaining a coating that is uniformly distributed over the entire mating surface, is exactly the correct thickness required and is without excess. It is also very difficult to apply the coating without contaminating the other parts of the seal or of the machine in which the seal is installed. And, of course, there is the problem of obtaining expeditious and uniformly reliable installation of the coated seals on assembly lines employing semi-skilled labor. Moreover, it is impractical to post-test or inspect the completed assembly for faulty workmanship.

The present invention overcomes the many disadvantages and shortcomings of prior practices in an exceedingly simple and effective manner without any substantial increase in the manufacturing cost of the seal itself, and it results in very material overall savings. In general, this is accomplished by coating the peripheral face of the seal case with a tough, resilient layer of a thermoplastic or a thermosetting resin in such manner that the coating is intimately and firmly bonded to the seal case. This coating is sufficiently shearable along the direction of a shearing force applied parallel to the mating faces, that the plastic will flow into and fill imperfections in the mating faces without pulling loose from the seal case as the seal is pressed into its assembled position. The toughness and resilience of the coating provide sufficient resistance to abrasion and surface injury to permit normal handling, packaging, shipment and assembly. Of very considerable importance is the fact that the coating is preferably so thin that its presence assures the sealing of voids, scratches and the like, but does not interfere with a substantially or actual metal-to-metal contact over a major portion of the interface between the metal case and the assembly housing, thereby providing a rigid anchorage of the case to the housing. This substantially metal-to-metal contact under radial pressure is essential to avoid the possibility of the seal becoming displaced in service under vibration or shock loads. For example, seal cases having rubber coatings of substantial thickness tend to pop or work out under shock, or even as the result of temperature changes.

Accordingly, it is an objective of the invention to provide a metal encased oil seal for use between relatively rotating elements which seal has a tough coating of shearable plastic-like resinous material bonded to the particular surface thereof adapted to mate with another part.

Another object of the invention is to provide a manufacturer-applied coating on the metal case of an oil seal, which results in a leak-tight seal of the metal case against a metal wall after eventual installation at a time distant from the time of application of the coating.

Another object is the provision of a metal encased oil seal having a coating of resin-like material uniformly distributed on the peripheral face thereof and adapted to be press fitted to another member and to provide a fluid-tight high friction joint therewith.

Still another object is a simple and inexpensive mode of applying a thin coating of tough resilient material to a cylindrical seating surface on the casing of an oil seal.

A further object is the provision of a metal encased oil seal having a coating bonded to its peripheral rim and of sufficient thickness to fill defects in the metal surfaces between which it is sandwiched and yet thin enough and uniform enough to assure concentricity and shearable enough to permit substantially metal-to-metal anchorage between the case and the housing bore in which it is assembled.

Numerous other objects and advantages of the invention will become apparent from the following detailed specification of a structural embodiment and preferred modes of making the same as illustrated in the accompanying drawings, wherein.

Figure 1:
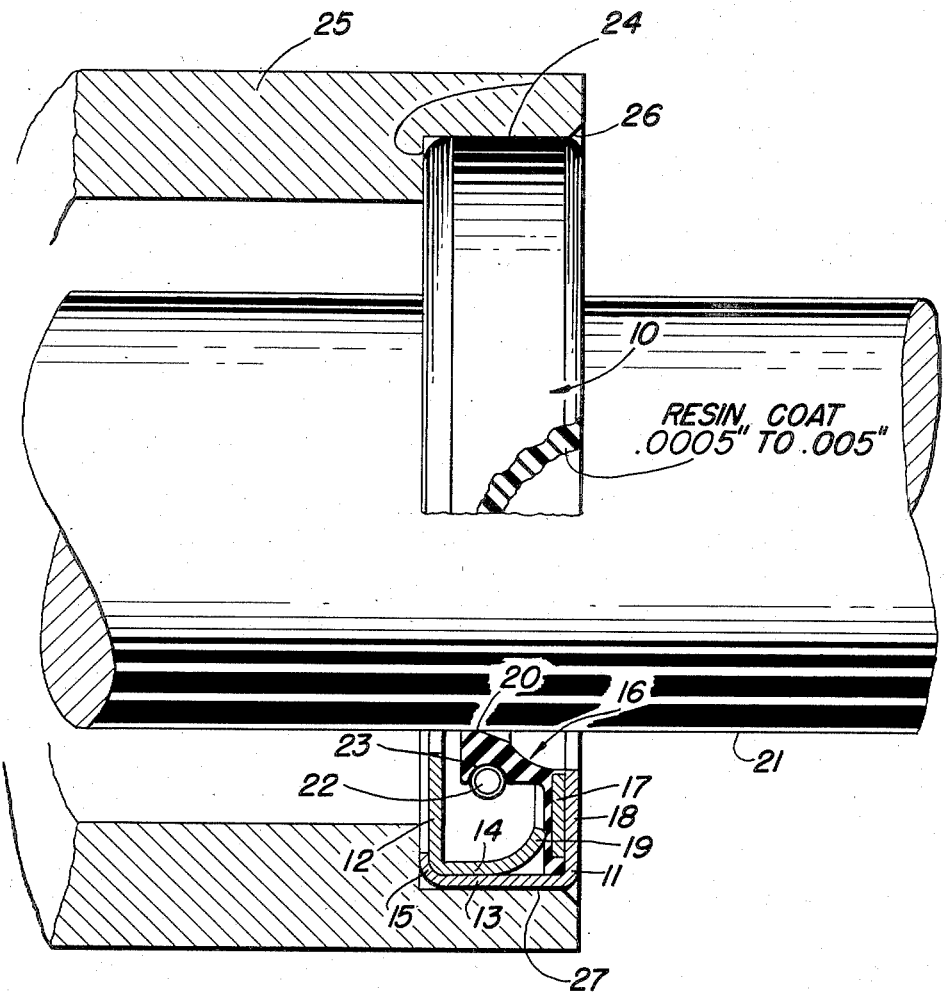
Fig. 1 is a vertical sectional view through an oil seal incorporating the invention and installed on a rotatable shaft.

Fig. 1 illustrates a typical oil seal incorporating the present invention. The oil seal unit 10 comprises an outer cupped shell 11 and an inner cupped shell 12, both normally of metal, such as steel. Shells 11 and 12 face oppositely to one another with their cylindrical flanges 13 and 14 nested together and held assembled by the curled-over rim 15 of the flange 13. The oil sealing element generally designated 16 may be made up of leather, oil-resistant synthetic rubber, or other suitable material and may be made in any well-known shape and configuration. As shown by way of example, a sealing element of synthetic rubber is bonded to all except one face of a metal washer 17. The uncovered surface is intended to seat directly against the radial flange 18 of the outer shell element 11 and to be locked in this fluid-tight relation by the in-turned flange 19 of the inner casing shell 12. This structure is that of Patent No. 2,626,169, and other types of lip anchorage may be used.

The sealing lip element 16 has a sharp sealing lip 20 having a normal diameter slightly less than a shaft 21 with which it is designed to be used. In consequence, the resiliency of the sealing element tends to maintain the lip 20 in firm sealing relation with the shaft, and this condition may be augmented by a garter spring 22 seated in a groove 23 of the sealing element 16.

The typical oil seal 10 just described is intended to be mounted within a shouldered bore 24 of a machine housing 25 surrounding the shaft 21. The entering edge of the bore 24 may be chamfered at 26 as an aid in guiding the rounded leading or toe edge of the seal case into position during the assembly operation. The reason for the chamfer 26 is that the diameter of the coated seal casing is normally several thousandths of an inch greater than that of the side wall of the bore 24 to provide a strong press or frictional fit between the seal case and the housing bore.

The present invention assures a tight fit, and particularly a leak-tight fit, by providing the outer cylindrical surface of the metal-encased seal 10 with a coating 27 tightly bonded to the shell 13 and yet capable of being sheared off to the extent necessary to fill any crevices, scratches, or surface blemishes in the wall of the housing bore 24 as the seal 10 is driven home therein during the assembly operation. It is important that this coating 27 be uniformly distributed over the entire outer cylindrical surface of the case 13 to avoid any possibility of the oil sealing lip 20 being eccentric with respect to the axis of shaft 21. This highly important objective, as well as others, is best assured by using a coating 27 of the minimum thickness requisite to fill imperfections in the bore wall 24.

Figure 6:
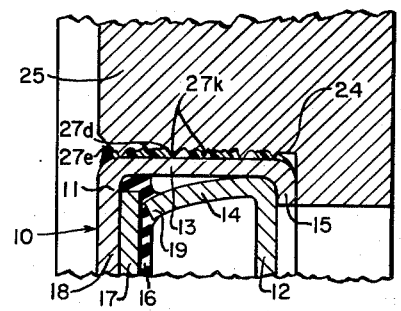
Fig. 6 is a similar view of the seal of Fig. 5 after installation. The thickness of the coating has necessarily had to be exaggerated in these views.
Figure 7:
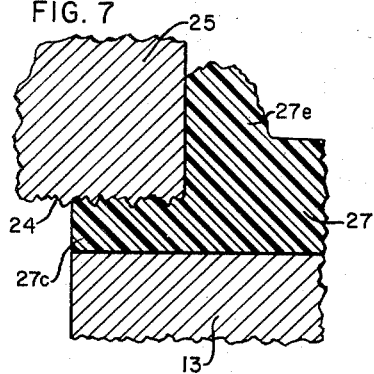
Fig. 7 is a greatly enlarged fragmentary view in section showing the effect of the shearing action that happens when a seal of the present invention is installed.
Figure 8:
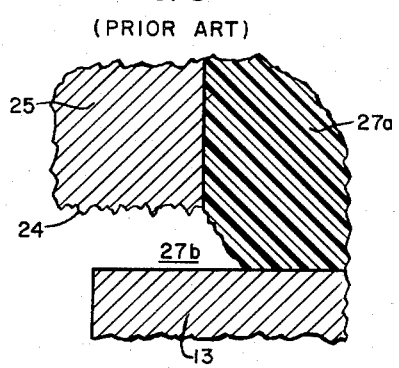
Fig. 8 is a similar view illustrating the effect of the seal shearing action on a seal wherein the coating has a shearing strength greater than the strength of its bond to the metal.

Another function of equal import is that the coating 27 shall be more easily sheared off than stripped from the metal. The shear strength of the coating 27 along the direction of application of the shearing force has to be less than the strength of the bond between the coating 27 and the seal case 13. Fig. 8 shows how a coating 27a, whose shear strength is greater than the strength of its bond to the case 13, will peel off the case 13 and leave a gap 27b between the case 13 and the bore 24, where leakage can occur. The coating 27 of this invention shears off only where the shearing force is exerted, leaving a remaining portion 27c sealing tightly against the shearing wall (Fig. 7). The portion 27d sheared off may fill scratches, etc. in the bore wall 24 (Fig. 6) while the excess 27e is rolled up around the outside of the seal and bore as shown in Fig. 6 where it acts as a sealant.

Figure 9:
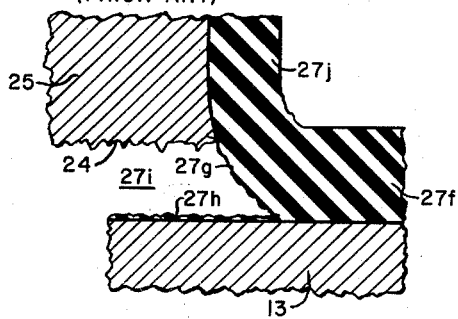
Fig. 9 is a similar view illustrating the effect of the same shearing action on a rubber-coated seal of another prior art installation.

It is important for the shearing to continue in the direction of the applied shearing force. This cannot be fulfilled by natural or synthetic rubber coatings, because rubbers have grain planes, due to flow during vulcanization, that result in the irregular tearing shown in Fig. 9. There, a sealing element 27f tore down along a line 27g leaving a thin portion 27h bonded to the case 13, the bond strength being greater than the shear strength. This resulted in a gap 27i between the bore 24 and the case 13, while the bulk of the rubber merely piled up at 27j outside the gap 27i. In many places the metal bore 24 will scrape or crack off the full thickness of the coating 27 of this invention due to the tightness of the fit, providing substantial areas 27k of actual metal-to-metal contact, while between these areas the coating 27c that is not sheared off maintains a leak-tight seal. This means that the coating 27 will be pierced and largely sheared away in those areas where there is firm metal-to-metal contact. Experience has shown that a coating thickness of .0005" to .005" is highly satisfactory, although thickness somewhat greater than the maximum thickness mentioned may be used with success in some instances.

The coating material is preferably prepared from either a thermoplastic or a thermosetting resin and a suitable solvent. Examples of suitable resins are acrylic, vinyl, phenolic, melamine, epoxy, alkyl, and aryl. In some instances, modification by known agents may be advised or even necessary to produce a relatively pliable film having the desired characteristics; namely, a shear strength along the direction of shear lower than the bonding strength to metal and the ability to shear truly instead of following grain, such as exists in rubber. Rubbers are not satisfactory for practicing this invention, whether they are hard or soft.

Suitable solvents are those for the particular resin, as known in the art, and include toluene, benzene, xylene, methyl-ethyl-ketone, water (in some instances) and the like. Each of these combinations has slightly different characteristics, and one combination which we have found to have particularly desirable characteristics is an acrylic resin dissolved in xylene. A coating formed of this material is highly resistant to oil and grease, forms a particularly tight bond with the metal seal casing, is resistant to the high temperatures often encountered in oil seal applications, is very tough yet sufficiently plastic to flow under high shearing stresses to fill surface imperfections in the juxtaposed metal surfaces.

The proportion of resin and solvent differs somewhat depending upon the particular combination of constituents employed, as well as upon the method of applying the material to the seal casings. A higher percentage of solvent is used when applying the coating by the spraying method than by the dipping or squeegee methods.

Figure 2:
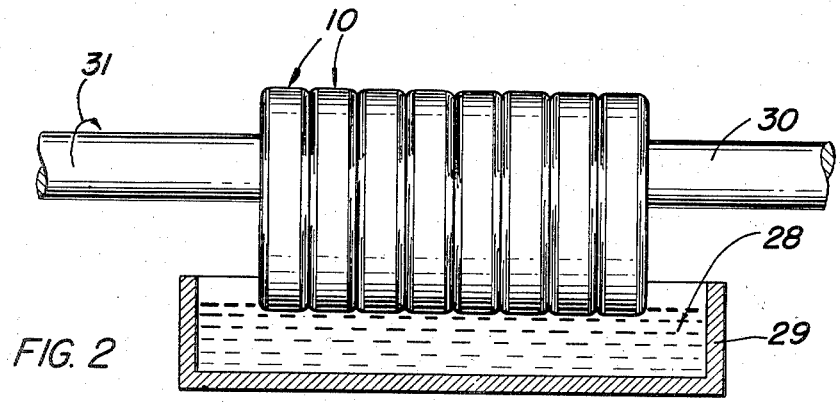
Fig. 2 is a schematic view of one mode of applying the resinous coating to an oil seal.

Referring to Fig. 2 showing the dipping method of coating application, it will be seen that a solution 28 of the resin in its solvent is contained in a shallow open-topped receptacle 29. A group of seals 10 located in side-by-side relation on a mandrel 30 may be suitably suspended as on a pair of notched pedestals, not shown, but arranged to support the mandrel with the lower outer surface only of the seal casings submerged in coating material 28. The mandrel is then slowly rotated as indicated by arrow 31 to bring the entire outer surface of seals 10 into the bath. The evaporation of the solvent is preferably aided by streams of air flowing past the freshly coated casings. Initially, the air may be warmed to aid in the evaporation process, but as soon as the solvent has substantially evaporated it is preferable to use cold air to hasten the setting of the coating. As soon as the first layer becomes tacky, a second layer may be applied in the same manner as the initial layer, after which the drying procedure is repeated. If additional layers are required to bring the finished coating to the desired thickness, then additional layers are applied in the same manner. Usually, however, two layers are adequate to provide a coating 27 of the requisite thickness.

Figure 3:
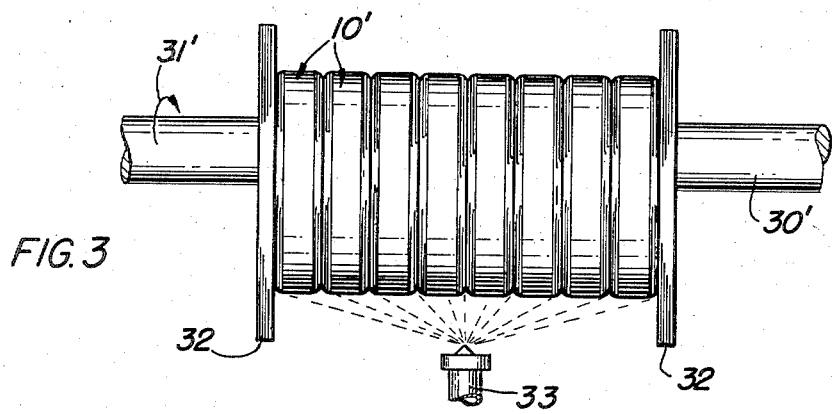
Fig. 3 is a schematic view of another mode of applying the coating.

Fig. 3 shows the manner in which the coating 27 may be applied by the spray method. A group of untreated seal casings 10 may be mounted on a mandrel 30' and held tightly clamped against one another by a pair of discs 32, the discs 32 may be held in place against the casings by any suitable means such as set screws not shown. This avoids any possibility of the fine coating spray from reaching the side or interior surfaces of the seals, as would otherwise occur. The mandrel 30' may be supported as before but in close proximity to one or more spray nozzles 33 connected to a suply of the liquid coating material. The mandrel 30' may be rotated in a direction 31' as the spray nozzles 33 are moved axially of the mandrel 30' or the mandrel 30' may remain fixed while the spray nozzles 33 are rotated in spaced relation about the exterior surfaces of the seals. After a layer of the coating 27 has been applied, the coating is dried as described above and one or more additional layers are applied by the spray method. We have also found that it is quite feasible to apply a resin coat of any desired thickness by the spray method and without discontinuing the spray until the full coat is obtained. This is accomplished by moving the spray nozzle 33 and seal cases relative to one another and directing streams of drying air over the freshly sprayed area in such manner that a freshly applied layer sets before a new layer is added.

Figure 4:
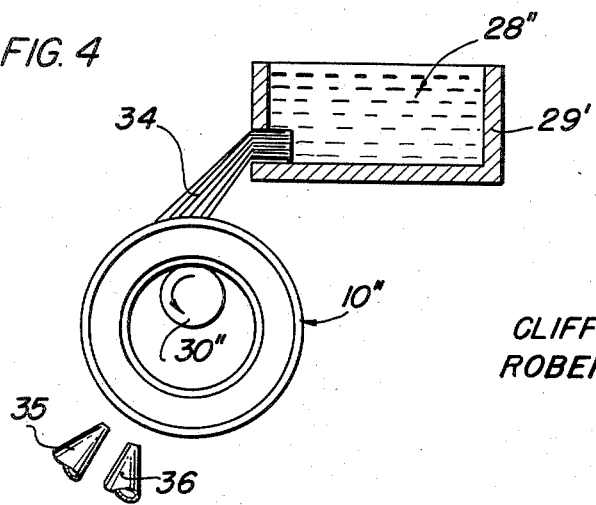
Fig. 4 illustrates still another method of coating the external surface of the seal case.

Still another method of applying the coating is by way of a squeegee, as illustrated in Fig. 4. The squeegee 34 of bristles, felting, cellular material or the like, is connected with a liquid supply of the coating 28''. The tip of the squeegee is arranged to press against the peripheral surface of a group of the seals 10'' supported on a rotating mandrel 30''. After the first layer is applied, warm air may be passed over the coating by means of one or more nozzles 35. As the resin begins to set, cold air from one or more nozzles 36 can be passed over the coating to hasten the setting operation. It will, of course, be understood that similar nozzles or other air distributing means may be used with the equipment illustrated in Figs. 2 and 3.

Figure 5:
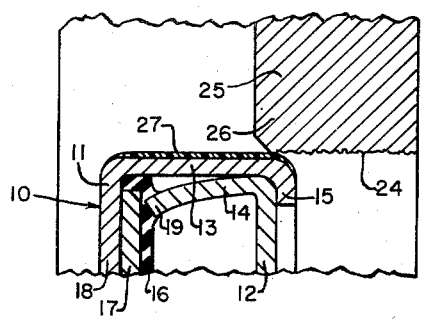
Fig. 5 is an enlarged fragmentary view in section of a seal about to be installed in a housing bore.

Substantially the identical product results from employing any one of the described methods. When the seals have become dry they are removed from the mandrel and packaged for shipment. Installation of the seals at the point of use is a very simple and quickly performed operation. The workman removes the seals from the package, inserts them over the shaft and then drives them home in housing bore 24 by means of a convenient tool. The curled toe rim 15 of the casing cooperates with the chamfered edge 26 of the housing bore to start the casing into its assembled position. A couple of sharp blows on the seating tool then suffices to drive the seal home with the resinous coating 27 (cooperating with the metal-to-metal contact where it is sheared completely off) to provide a high-friction, fluid-tight anchor between the wall of the bore and the outer surface of the seal case. In the seating process (Figs. 5 and 6), certain portions 27d of the coating 27 are sheared and forced to move under pressure into imperfections in the metal surfaces forming the interface. Any surplus 27e collects in the shallow groove provided by the chamfered edge 26 of the housing. This groove provides a protective deposit channel for this excess material. In the shearing process, any scratch, depression or unevenness in the side wall of the bore is filled and sealed by the coating to safeguard against any possibility of either liquid or gaseous leakage past the rim of the seal.

Although we have described our invention with a certain degree of particularity, it is understood that the present disclosure has been made only by way of example and that numerous changes in the details of construction and the method of applying and anchoring coating to encased oil seals may be made without departing from the spirit and scope of the invention as hereinafter claimed.

We claim as our invention:

1. An oil seal for use between relatively rotating, concentrically arranged machine members comprising an annular resilient seal member having a sealing lip adapted to form an oil-tight seal with one of said machine members, said seal member also having a support portion for said lip, a metal casing secured to said support portion and having a cylindrical face adapted to be press-fitted onto the other of said machine members, and a thin coating of resin not substantially less than 0.0005'' thick bonded to said cylindrical face and uniformly distributed thereover, the strength of said bond being greater than the shear strength of said resin, said coating cooperating with said cylindrical face in forming a fluid-tight mechanical joint therewith by flowing under shear into imperfections therein.

2. An oil seal for sealing the space between a rotatable shaft and a housing through which said shaft extends, said seal comprising a metal casing having an outer cylindrical surface adapted to have a tight mechanical press fit with a concentrically arranged bore wall in a housing wall, a resilient sealing ring element having a support portion secured to said metal casing in a fluid-tight manner and having an inner peripheral lip adapted to seal against a rotatable shaft in a fluid-tight manner, and a thin coating of shearable synthetic resin bonded to the outer cylindrical surface of said casing, said coating having an original manufactured thickness not substantially less than 0.0005 inch and being highly resistant to abrasion and subject to deformation and flow under shearing and high pressure forces so as to accommodate said coating to imperfections in a bore wall and to form a fluid-tight seal and anchorage between said oil seal casing and a bore wall.

3. That improvement in oil seals for use in providing a substantially fluid-tight seal between a movable shaft member and a housing member having a bore through which said shaft extends and wherein said seal is provided with a cylindrical surface adapted to have a press fit with one of said members, which improvement comprising a thin layer, at least as thick as the average surface roughness of said bore, of an oil-and-abrasion-resistant material bonded to said cylindrical surface, said material responding to high shearing and pressure forces so that when such forces act during the assembly of the seal into the bore of a housing member they cause said material to move and fill imperfections in the bore wall and form a fluid-tight seal therewith as well as a strong joint between said oil seal and the bore wall.

4. In combination, a movable shaft, a housing wall having an opening through which said shaft projects in spaced relation thereto, an oil seal bore in said wall opening concentric with said shaft, a metal-encased oil seal for sealing the space between said bore and said shaft, and means for anchoring a cylindrical wall of said oil seal case against a cylindrical wall of said bore in a fluid-tight manner comprising a layer of resin pre-bonded to one of said cylindrical walls, said layer of resin being uniformly distributed over said surface to a thickness at least as great as the average surface roughness of said bore and fixed against displacement therefrom except when subjected to high pressure or shearing forces whereby excess portions of said layer are removed as said seal is press-fitted into said bore to fill irregularities in the uncoated cylindrical wall leaving portions of said cylindrical walls in metal-to-metal contact with one another during the assembly of said oil seal into said bore.

5. An oil seal for sealing the space between a rotatable shaft and a housing through which said shaft extends, said seal comprising a metal casing having an outer cylindrical surface adapted to have a tight mechanical press fit with a concentrically arranged bore wall in a housing wall, a resilient sealing ring element having a support portion secured to said metal casing in a fluid-tight manner and having an inner peripheral lip adapted to seal against a rotatable shaft in a fluid-tight manner, and a thin coating of shearable acrylic resin at least 0.0005'' thick bonded to the outer cylindrical surface of said casing, said coating being highly resistant to abrasion and subject to deformation and flow under shearing and high pressure forces so as to accommodate said coating to imperfections in a bore wall and to form a fluid-tight seal and anchorage between said oil seal casing and a bore wall.

6. An oil seal for sealing the space between a rotatable shaft and a housing through which said shaft extends, said seal comprising a metal casing having an outer cylindrical surface adapted to have a tight mechanical press fit with a concentrically arranged bore wall in a housing wall, a resilient sealing ring element having a support portion secured to said metal casing in a fluid-tight manner and having an inner peripheral lip adapted to seal against a rotatable shaft in a fluid tight manner, and a thin coating of shearable synthetic resin approximately 0.0005" to 0.005" thick bonded to the outer cylindrical surface of said casing, said coating being highly resistant to abrasion and subject to deformation and flow under shearing and high pressure forces so as to accommodate said coating to imperfections in a bore wall and to form a fluid-tight seal and anchorage between said oil seal casing and a bore wall.

References Cited in the file of this patent

UNITED STATES PATENTS

| | | |
|---|---|---|
| 2,626,169 | Johnson et al. | Jan. 20, 1953 |
| 2,646,295 | Victor | July 21, 1953 |
| 2,695,186 | Balfe | Nov. 23, 1954 |